US011561509B2

(12) United States Patent
Shi

(10) Patent No.: US 11,561,509 B2
(45) Date of Patent: Jan. 24, 2023

(54) TWO-DIMENSIONAL HOLOGRAPHIC IMAGE PROJECTION DISPLAY METHOD AND APPARATUS

(71) Applicant: BOE Technology Group Co., Ltd., Beijing (CN)

(72) Inventor: Bingchuan Shi, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 915 days.

(21) Appl. No.: 16/464,229

(22) PCT Filed: Jan. 3, 2019

(86) PCT No.: PCT/CN2019/070267
§ 371 (c)(1),
(2) Date: May 24, 2019

(87) PCT Pub. No.: WO2019/200977
PCT Pub. Date: Oct. 24, 2019

(65) Prior Publication Data
US 2020/0285195 A1 Sep. 10, 2020

(30) Foreign Application Priority Data

Apr. 17, 2018 (CN) .......................... 201810341650.0

(51) Int. Cl.
*G03H 1/22* (2006.01)
*G02B 5/32* (2006.01)
*G03H 1/08* (2006.01)

(52) U.S. Cl.
CPC ............. *G03H 1/2294* (2013.01); *G02B 5/32* (2013.01); *G03H 1/0841* (2013.01);
(Continued)

(58) Field of Classification Search
CPC .. G03H 1/2294; G03H 1/0841; G03H 1/2205; G03H 1/2286; G03H 2001/2207;
(Continued)

(56) References Cited

U.S. PATENT DOCUMENTS 3,632,181 A * 1/1972 Lee .......................... G03H 1/22
359/26
4,916,485 A 4/1990 Loth et al.
(Continued)

FOREIGN PATENT DOCUMENTS

CN 102081339 A * 6/2011
CN 104155834 A 11/2014
(Continued)

OTHER PUBLICATIONS

International Search Report & Written Opinion dated Apr. 3, 2019, regarding PCT/CN2019/070267.
(Continued)

*Primary Examiner* — Stephone B Allen
*Assistant Examiner* — Rahman Abdur
(74) *Attorney, Agent, or Firm* — Intellectual Valley Law, P.C.

(57) ABSTRACT

A two-dimensional holographic image projection display method. The method includes illuminating a first modulating part of a spatial light modulator with a first incident light beam at a first incident angle with respect to a direction normal to a main surface of the spatial light modulator to form a first projection region on an imaging plane; and illuminating a second modulating part of the spatial light modulator with a second incident light beam at a second incident angle with respect to the direction normal to the main surface of the spatial light modulator to form a second projection region on the imaging plane. The first projection region abuts or partially overlaps with the second projection
(Continued)

region at an interface substantially parallel to a lateral direction of the spatial light modulator.

15 Claims, 6 Drawing Sheets

(52) U.S. Cl.
CPC ......... *G03H 1/2205* (2013.01); *G03H 1/2286* (2013.01); *G03H 2001/2207* (2013.01); *G03H 2210/20* (2013.01); *G03H 2222/34* (2013.01); *G03H 2223/19* (2013.01)

(58) Field of Classification Search
CPC ........... G03H 2210/20; G03H 2222/34; G03H 2223/19; G03H 2001/2218; G03H 2001/2223; G02B 5/32; G03B 35/18; G03B 21/005
USPC .......................................................... 359/9
See application file for complete search history.

(56) References Cited

U.S. PATENT DOCUMENTS

| 2018/0203413 A1 | 7/2018 | Zhang |
| 2018/0267463 A1 | 9/2018 | Chen |

FOREIGN PATENT DOCUMENTS

| CN | 105739281 A | 7/2016 |
| CN | 106502075 A | 3/2017 |
| CN | 106647214 A | 5/2017 |
| GB | 2552851 A | 2/2018 |
| JP | H05323123 A | 12/1993 |
| WO | 2017114789 A2 | 7/2017 |

OTHER PUBLICATIONS

First Office Action in the Chinese Patent Application No. 201810341650. 0, dated May 8, 2019; English translation attached.

* cited by examiner

Illuminating a first modulating part of a spatial light modulator with a first incident light beam at a first incident angle with respect to a direction normal to a main surface of the spatial light modulator to form a first projection region on an imaging plane

Illuminating a second modulating part of the spatial light modulator with a second incident light beam at a second incident angle with respect to the direction normal to the main surface of the spatial light modulator to form a second projection region on the imaging plane

FIG. 3

TWO-DIMENSIONAL HOLOGRAPHIC IMAGE PROJECTION DISPLAY METHOD AND APPARATUS

CROSS-REFERENCE TO RELATED APPLICATION

This application is a national stage application under 35 U.S.C. § 371 of International Application No. PCT/CN2019/070267, filed Jan. 3, 2019, which claims priority to Chinese Patent Application No. 201810341650.0, filed Apr. 17, 2018, the contents of which are incorporated by reference in the entirety.

TECHNICAL FIELD

The present invention relates to a two-dimensional holographic image projection display method and a two-dimensional holographic image projection display apparatus.

BACKGROUND

Most of the two-dimensional holographic projection apparatuses based on phase modulation device use Fast Fourier Transform algorithm. Because the Fast Fourier Transform algorithm inherently has the spatial domain restrictions and the frequency domain restrictions when samples are taken, there is a strict correspondence relationship between the spatial domain and the frequency domain. During a process of two-dimensional holographic projection, an imaging plane is a spatial domain plane, and a spatial light modulator controls a frequency domain plane, the relationship between the spatial domain plane and the frequency domain plane can be described by a Fourier Transform relationship. Using Fourier Transform, an image coding of a phase distribution diagram can be calculated by the spatial light modulator, and a two-dimensional image can be formed on an imaging plane according to the image coding of the phase distribution diagram.

SUMMARY

In one aspect, the present invention provides a two-dimensional holographic image projection display method, comprising illuminating a first modulating part of a spatial light modulator with a first incident light beam at a first incident angle with respect to a direction normal to a main surface of the spatial light modulator to form a first projection region on an imaging plane; and illuminating a second modulating part of the spatial light modulator with a second incident light beam at a second incident angle with respect to the direction normal to the main surface of the spatial light modulator to form a second projection region on the imaging plane; wherein the first projection region abuts or partially overlaps with the second projection region at an interface substantially parallel to a lateral direction of the spatial light modulator.

Optionally, the two-dimensional holographic image projection display method further comprises stitching the first projection region and second projection region are stitched together to form a composite imaging region on the imaging plane.

Optionally, the composite imaging region has a substantially rectangular shape.

Optionally, the first incident light beam and the second incident light beam are separated from each other at or about a boundary between the first modulating part and the second modulating part.

Optionally, the two-dimensional holographic image projection display method further comprises encoding a first image loaded onto the first modulating part to perform a first image correction on a first image distortion in the first projection region, thereby forming a first corrected projection region having a substantially rectangular shape; and encoding a second image loaded onto the second modulating part to perform a second image correction on a second image distortion in the second projection region, thereby forming a second corrected projection region having a substantially rectangular shape; wherein lengths of short sides of the first corrected projection region, the second corrected projection region, and a composite corrected imaging region formed by stitching the first corrected projection region and the second corrected projection region together are substantially same as a minimum width along a lateral direction of the spatial light modulator of the first projection region and the second projection region.

Optionally, the two-dimensional holographic image projection display method further comprises encoding a first image loaded onto the first modulating part to perform a first brightness uniformity correction pre-processing; and encoding a second image loaded onto the second modulating part to perform a second brightness uniformity correction pre-processing.

Optionally, the two-dimensional holographic image projection display method further comprises filtering a first modulated light modulated by the first modulating part; and filtering a second modulated light modulated by the second modulating part.

Optionally, the two-dimensional holographic image projection display method further comprises adjusting an aperture ratio of the composite imaging region by adjusting one or a combination of the first incident angle and the second incident angle.

In another aspect, the present invention provides a two-dimensional holographic image projection display apparatus, comprising a spatial light modulator; an imaging plane; and an illumination source configured to provide a first incident light beam illuminating a first modulating part of the spatial light modulator at a first incident angle with respect to a main surface of the spatial light modulator, and a second incident light beam illuminating a second modulating part of the spatial light modulator with a second incident light beam at a second incident angle with respect to the main surface of the spatial light modulator; wherein the first modulating part of the spatial light modulator is configured to modulate the first incident light beam to form a first projection region on the imaging plane; the second modulating part of the spatial light modulator is configured to modulate the second incident light beam to form a second projection region on the imaging plane; and the first projection region abuts or partially overlaps with the second projection region at an interface substantially parallel to a lateral direction of the spatial light modulator.

Optionally, the first projection region and second projection region are stitched together to form a composite imaging region on the imaging plane.

Optionally, the composite imaging region has a substantially rectangular shape.

Optionally, the illumination source is configured to provide the first incident light beam and the second incident light beam so that the first incident light beam and the second incident light beam are separated from each other at or about a boundary between the first modulating part and the second modulating part.

Optionally, the first modulating part is configured to encode a first image loaded onto the first modulating part to perform a first image correction on a first image distortion in the first projection region, thereby forming a first corrected projection region having a substantially rectangular shape; the second modulating part is configured to encode a second image loaded onto the second modulating part to perform a second image correction on a second image distortion in the second projection region, thereby forming a second corrected projection region having a substantially rectangular shape; and lengths of short sides of the first corrected projection region, the second corrected projection region, and the composite corrected imaging region formed by stitching the first corrected projection region and the second corrected projection region together are substantially same as a minimum width along a lateral direction of the spatial light modulator of the first projection region and the second projection region.

Optionally, the first modulating part is configured to encode a first image loaded onto the first modulating part to perform a first brightness uniformity correction pre-processing; and the second modulating part is configured to encode a second image loaded onto the second modulating part to perform a second brightness uniformity correction pre-processing.

Optionally, the two-dimensional holographic image projection display apparatus further comprises a first filter configured to filter a first modulated light modulated by the first modulating part to generate a first filtered light; and a second filter configured to filter a second modulated light modulated by the second modulating part to generate a second filtered light.

Optionally, the two-dimensional holographic image projection display apparatus further comprises a first convex lens configured to focus the first modulated light modulated by the first modulating part onto the first filter; a second convex lens configured to focus the second modulated light modulated by the second modulating part onto the second filter; a third convex lens configured to focus the first filtered light onto the imaging plane; and a fourth convex lens configured to focus the second filtered light onto the imaging plane.

Optionally, the illumination source is configured to adjust one or a combination of the first incident angle and the second incident angle, thereby adjusting an aperture ratio of the composite imaging region.

BRIEF DESCRIPTION OF THE FIGURES

The following drawings are merely examples for illustrative purposes according to various disclosed embodiments and are not intended to limit the scope of the present invention.

FIG. 3 is a flow chat illustrating a two-dimensional holographic image projection display method in some embodiments according to the present disclosure.

DETAILED DESCRIPTION

Figure 1:
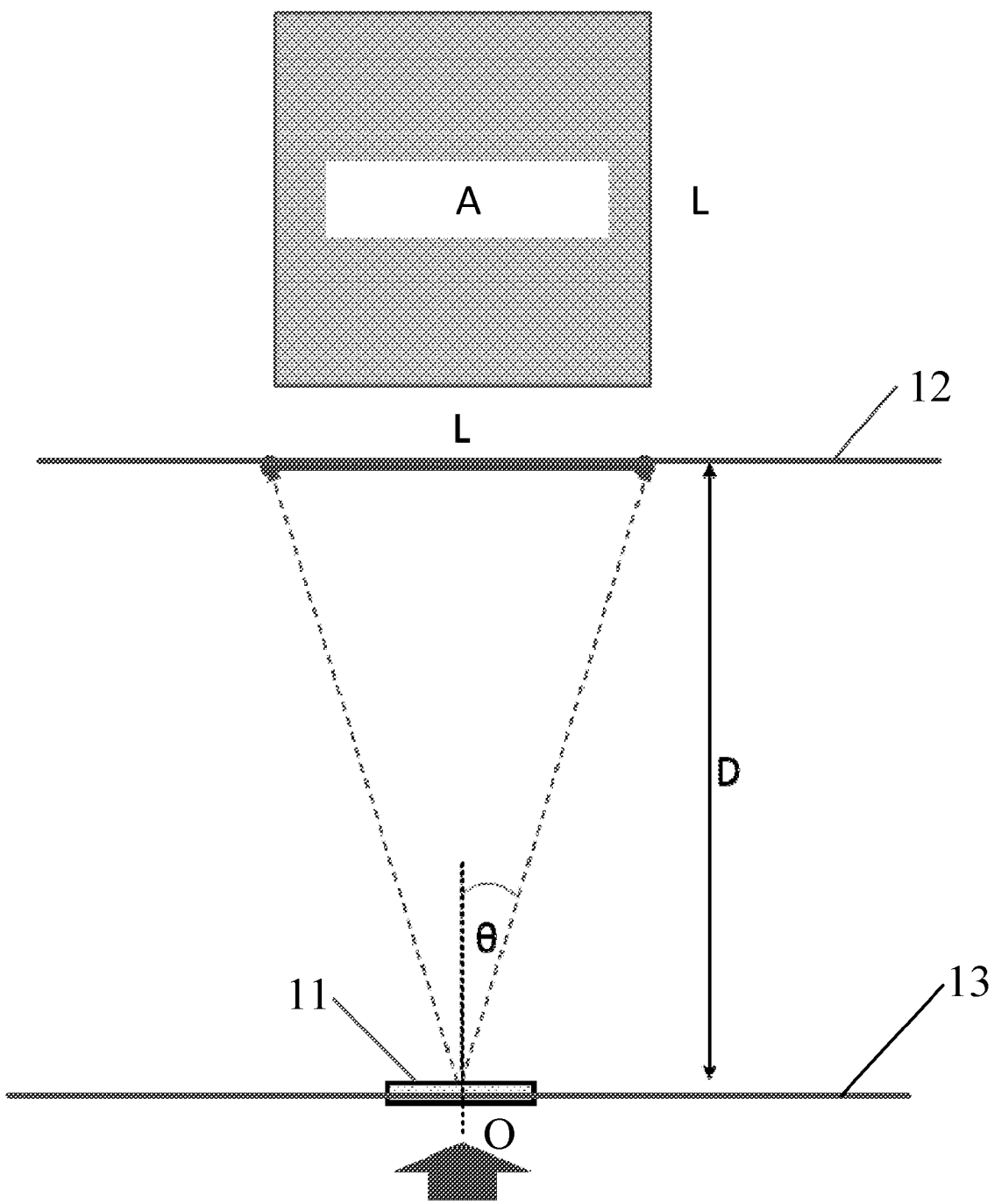
FIG. 1 is a schematic diagram illustrating a two-dimensional holographic image projection display method when an incident light beam is along a direction normal to a main surface of a spatial light modulator in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Due to the spatial domain restrictions and the frequency domain restrictions in using Fast Fourier Transform algorithm, a size of a projection region formed by a spatial light modulator is determined by a distance between adjacent pixels of the spatial light modulator, and the size of the projection region is not influenced by a size of a modulating area of the spatial light modulator. In a spatial light modulator, any two adjacent pixels of the plurality of pixels of the spatial light modulator is spaced apart from each other by a fixed distance in a two-dimensional plane. Therefore, a projection region formed by the spatial light modulator on an imaging plane has a substantially square shape. However, a modulating area of the spatial light modulator typically has a substantially rectangular shape. For example, an aspect ratio of a rectangular modulating area of the spatial light modulator is 16:9. When the rectangular modulating area is used to display images onto a projection region in square shape, it results in an oversampling along a longitudinal direction of the rectangular modulating area, leading to a waste of computing resources and the space-bandwidth product of the spatial light modulator. Moreover, people are more used to see an image area in a rectangular-shaped screen. Therefore, a projection region of a square shape formed by the spatial light modulator is incompatible with a typical view's viewing habits.

Accordingly, the present disclosure provides, inter alia, a two-dimensional holographic image projection display method and a two-dimensional holographic image projection display apparatus that substantially obviate one or more of the problems due to limitations and disadvantages of the related art. In one aspect, the present disclosure provides a two-dimensional holographic image projection display method. In some embodiments, the method includes illuminating a first modulating part of a spatial light modulator with a first incident light beam at a first incident angle with respect to a direction normal to a main surface of the spatial light modulator to form a first projection region on an imaging plane; and illuminating a second modulating part of the spatial light modulator with a second incident light beam at a second incident angle with respect to the direction normal to the main surface of the spatial light modulator to form a second projection region on the imaging plane. Optionally, the first projection region abuts or partially overlaps with the second projection region at an interface substantially parallel to a lateral direction of the spatial light modulator. Optionally, the method further includes stitching the first projection region and second projection region are stitched together to form a composite imaging region on the imaging plane. The present method generates a single composite imaging region of a substantially rectangular shape using a single spatial light modulator, obviating a waste of computing resources and space-bandwidth product of the spatial light modulator. The composite imaging region of the substantially rectangular shape is more compatible with a typical view's viewing habits.

FIG. 1 is a schematic diagram illustrating a two-dimensional holographic image projection display method when an incident light beam is along a direction normal to a main surface of a spatial light modulator in some embodiments according to the present disclosure. Referring to FIG. 1, a spatial light modulator 11 is illuminated with an incident light beam along a direction normal to a main surface 13 of the spatial light modulator 11. A substantially square-shaped projection region A is formed on an imaging plane 12. Optionally, adjacent pixels of a plurality of pixels of the spatial light modulator 11 are spaced apart from each other by a fixed distance. In one example, the fixed distance is a. Optionally, a distance between the main surface 13 of the spatial light modulator 11 and the imaging plane 12 is D. Therefore, an angle θ between the direction of the incident light beam (the direction normal to the main surface 13) and a direction from an incident point O on the main surface 13 of the spatial light modulator 11 to a lateral edge of the square projection region A satisfies the following equation:

$$\sin\theta = \frac{1}{2a}$$

A length L of a longitudinal edge of the substantially square projection region satisfies the following equation:

$$L = 2D \tan\theta$$

Figure 2:
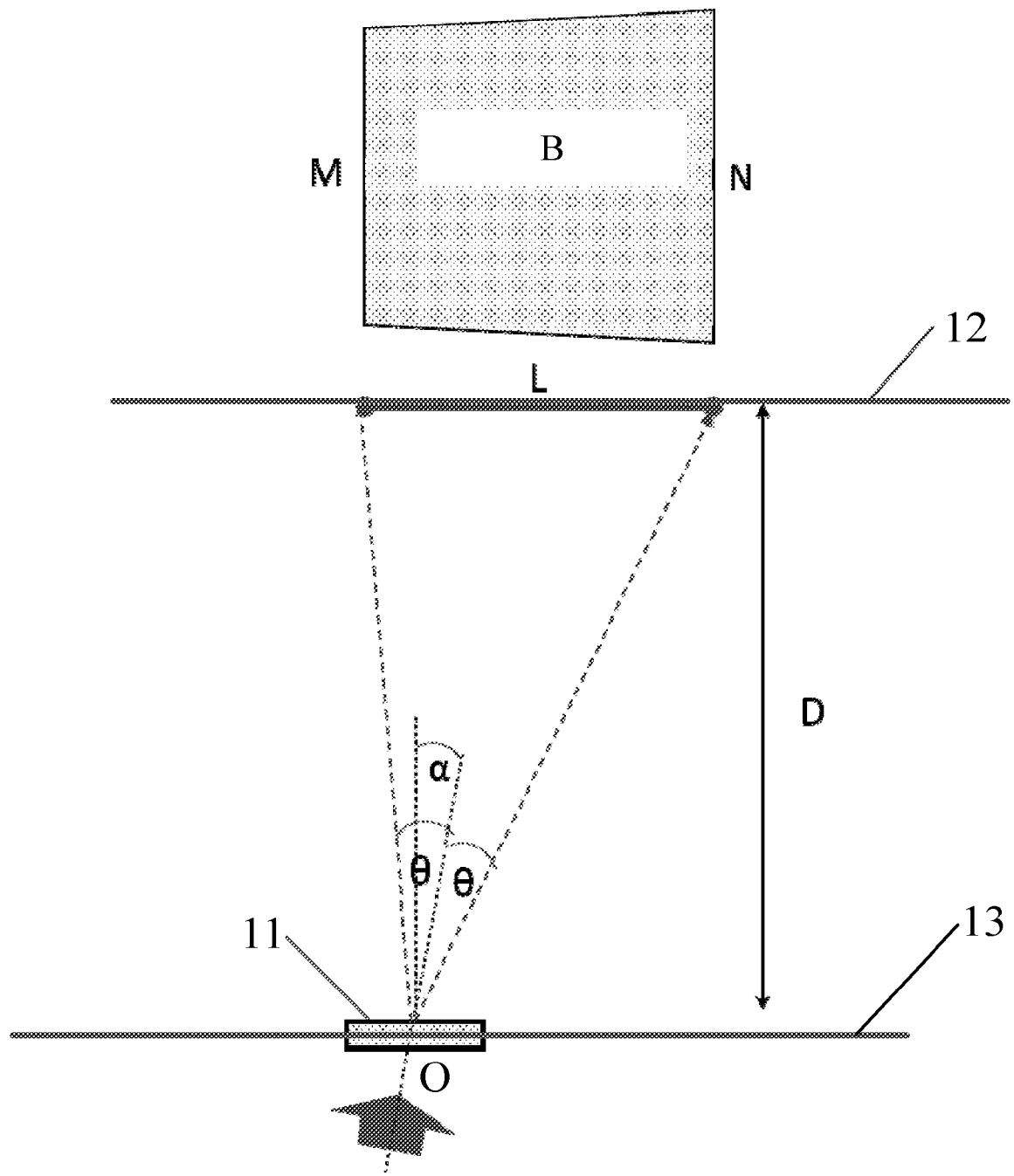
FIG. 2 is a schematic diagram illustrating a two-dimensional holographic image projection display method when an incident light beam is along a direction having an incident angle with respect to a direction normal to a main surface of a spatial light modulator in some embodiments according to the present disclosure.

FIG. 2 is a schematic diagram illustrating a two-dimensional holographic image projection display method when an incident light beam is along a direction having an incident angle with respect to a direction normal to a main surface of a spatial light modulator in some embodiments according to the present disclosure. Referring to FIG. 2, when a spatial light modulator 11 is illuminated with an incident light beam having an incident angle α (e.g., α≠0) with respect to a direction normal to the main surface 13 of the spatial light modulator 11 to form a projection region B on the imaging plane 12, a center of the projection region B deviates from a center of the square projection region A formed in FIG. 1. For example, the projection region B formed on the imaging plane 12 is a trapezoidal projection region. Optionally, any two adjacent pixels of the plurality of pixels of the spatial light modulator 11 are spaced apart from each other by a fixed distance. In one example, the fixed distance is a. A distance between the main surface 13 of the spatial light modulator 11 and the imaging plane 12 is D. The incident angle α is an angle between the direction of the incident light beam and the direction normal to the main surface 13 of the spatial light modulator 11. The angle θ between the direction of the incident light beam and the direction from the incident point O on the main surface 13 of the spatial light modulator 11 to a lateral edge of the trapezoidal projection region B satisfies the following equation:

$$\sin\theta = \frac{1}{2a}$$

A height of the trapezoidal projection region B satisfies the following equation:

$$L = D \tan(\theta+\alpha) + D \tan(\theta-\alpha)$$

A length M of the top base of the trapezoidal projection region B satisfies the follow equation:

$$M = \frac{2D \tan\theta}{\cos(\theta-\alpha)}$$

A length N of the bottom base of the trapezoidal projection region B satisfies the follow equation:

$$N = \frac{2D \tan\theta}{\cos(\theta+\alpha)}$$

FIG. 3 is a flow chat illustrating a two-dimensional holographic image projection display method in some embodiments according to the present disclosure. Referring to FIG. 3, a two-dimensionally holographic image projection display method includes illuminating a first modulating part of the spatial light modulator with a first incident light beam at a first incident angle with respect to the direction normal to the main surface of the spatial light modulator to form a first projection region on the imaging plane; and illuminating a second modulating part of the spatial light modulator with a second incident light beam at a second incident angle with respect to the direction normal to the main surface of the spatial light modulator to form a second projection region on the imaging plane. Optionally, the first projection region abuts or partially overlaps with the second projection region at an interface substantially parallel to a lateral direction of the spatial light modulator. Optionally, the first projection region and second projection region are stitched together to form a composite imaging region on the imaging plane. Optionally, the composite imaging region has a substantially rectangular shape. Optionally, the spatial light modulator is a single spatial light modulator including a first modulating part and a second modulating part, the first modulating part and the second modulating part integral with each other constituting the single spatial light modulator.

Figure 4:
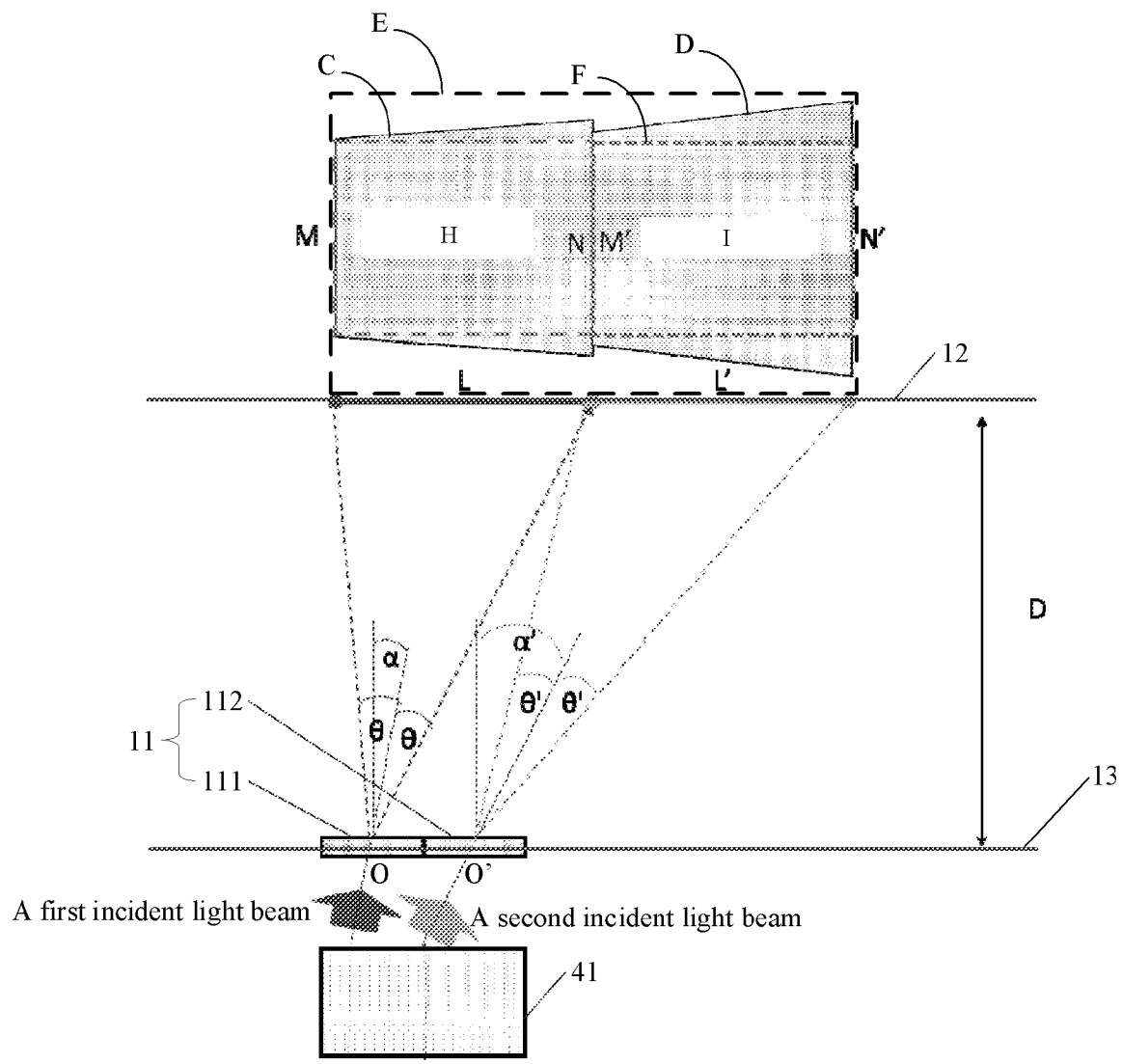
FIG. 4 is a schematic diagram illustrating a two-dimensional holographic image projection display method in some embodiments according to the present disclosure.

FIG. 4 is a schematic diagram illustrating a two-dimensional holographic image projection display method in some embodiments according to the present disclosure. Referring to FIG. 4, in some embodiments, a spatial light modulator is a single spatial light modulator including a first modulating part 111 and a second modulating part 112. Optionally, the modulating area of the spatial light modulator 11 has a substantially rectangular shape. In one example, an aspect ratio of the modulating area of the spatial light modulator 11 is 16:9. Optionally, both of the first modulating part 111 and the second modulating part 112 within the modulating area of the spatial light modulator 11 have aspect ratios of 8:9, therefore, the shapes of the first modulating part 111 and the second modulating part 112 are near-square rectangular shapes. Because each of the first modulating part 111 and the second modulating part 112 has a near-square rectangular shape, oversampling in each of the first modulating part 111 and the second modulating part 112 can be avoided, and the waste of computing resources and the space-bandwidth product of the spatial light modulator can also be avoided.

In some embodiments, an illumination source 41 emits a first incident light beam and a second incident light beam. Optionally, the first incident light beam is at a first incident angle α (e.g., α≠0) with respect to a direction normal to a main surface 13 of the spatial light modulator 11. Optionally, the second incident light beam is at a second incident angle α' (e.g., α'≠0) with respect to the direction normal to the main surface 13 of the spatial light modulator 11. In some embodiments, the first modulating part 111 of a spatial light modulator 11 is illuminated with the first incident light beam at the first incident angle α with respect to the direction normal to the main surface 13 of the spatial light modulator 11 to form a first projection region C on an imaging plane 12, and the second modulating part 112 of the spatial light modulator 11 is illuminated with the second incident light beam at the second incident angle α' with respect to the direction normal to the main surface 13 of the spatial light modulator 11 to form a second projection region D on the imaging plane 12. Optionally, the first projection region C and the second projection region D have near-rectangular trapezoidal shapes. In one example, the first incident angle α is 0, which means the first incident light beam has a direction normal to the main surface 13 of the spatial light modulator 11, therefore, the first projection region C formed on the imaging plane 12 has a substantially square shape. In another example, the second incident angle α' is 0, which means the second incident light beam has a direction normal to the main surface 13 of the spatial light modulator 11, therefore, the second projection region D formed on the imaging plane 12 has a substantially square shape. Optionally, the first projection region C abuts the second projection region D at an interface between the first projection region C and the second projection region D, the interface along a direction substantially parallel to a lateral direction of the spatial light modulator 11. As used herein, the term "abut" means "to meet," and "to be contiguous." "Contiguous" means "close together," "neighboring" or "adjoining." Consequently, to abut means to touch or to adjoin wherein the cut edges are in contact or in proximity. Optionally, the first projection region C partially overlaps with the second projection region D at an interface between the first projection region C and the second projection region D, the interface along a direction substantially parallel to a lateral direction of the spatial light modulator 11. Optionally, the first projection region C and the second projection region D are adjacent to each other but not abut to each other or overlapping with each other. In some embodiments, the first projection region C and second projection region D are stitched together to form a composite imaging region E on the imaging plane 12. Optionally, the composite imaging region E has a substantially rectangular shape, which is more likely to satisfy viewers' watching habits. As used herein, the term "substantially rectangular" refers to a polygonal shape (e.g., a parallelogram) in which the opposing sides are substantially parallel and the corner angles are substantially 90 degrees. As used herein, the term "substantially parallel" refers to two opposing sides forming an included angle in a range of 0 degree to approximately 15 degrees, e.g., 0 degree to approximately 1 degree, approximately 1 degree to approximately 2 degrees, approximately 2 degree to approximately 5 degrees, approximately 5 degree to approximately 10 degrees, and approximately 10 degree to approximately 15 degrees. Optionally, the corner angles of the substantially rectangular shape is in a range of approximately 75 degrees to approximately 105 degrees, e.g., approximately 89 degrees to approximately 91 degrees, approximately 88 degrees to approximately 92 degrees, approximately 85 degrees to approximately 95 degrees, and approximately 80 degrees to approximately 100 degrees. As used herein, the term "substantially square" refers to a polygonal shape (e.g., a parallelogram) in which the opposing sides are substantially parallel, the corner angles are substantially 90 degrees, and lengths of all sides are substantially same. As used herein, the term "substantially same" refers to a difference between two values not exceeding 10%, e.g., not exceeding 8%, not exceeding 6%, not exceeding 4%, not exceeding 2%, not exceeding 1%, not exceeding 0.5%, not exceeding 0.1%, not exceeding 0.05%, and not exceeding 0.01%.

In some embodiments, the first modulating part 111 of the spatial light modulator 11 and the second modulating part 112 of the spatial light modulator 11 are fully illuminated, and at the same time, the first modulating part 111 of the spatial light modulator 11 and the second modulating part 112 of the spatial light modulator 11 are separated from each other.

In some embodiments, the first modulating part 111 of the spatial light modulator 11 and the second modulating part 112 of the spatial light modulator 1 are not fully illuminated. Because a hologram carries all the information for presenting an image, in the circumstance that only partial of a plurality of light beams illuminates, a relatively complete image can still be presented on the imaging plane 12. In some embodiments, the illuminating source 41 emits the first incident light beam and the second incident light beam, and the first incident light beam and the second incident light beam are separated from each other at or about a boundary between the first modulating part 111 and the second modulating part 112.

In some embodiments, an incident light beam illuminates a spatial light modulator 11 at a non-zero incident angle with respect to the direction normal to the main surface 13 of the spatial light modulator 11, a projection region formed on the imaging plane 12 deviates from the projection region A formed on the imaging plane 12 in FIG. 1, resulting in an trapezoidal distortion on the projection region, e.g., the projection region is distorted from a square projection region in FIG. 1 to a trapezoidal projection region in FIG. 2. Also, a ratio of enlargement of an image displayed on the projection region changes as the deviation degree of center of the projection region increases. As the value of the incident angle increases, different values of the incident angles lead to different ratios of enlargement of an image displayed on the projection region. For example, two different incident light beams respectively with two different incident angles form two projection regions respectively having two different ratios of enlargement of image. The sizes of the two different projection regions having two different ratios of enlargement of images are different. Referring to FIG. 4, the first incident light beam has the first incident angle α with respect to the direction normal to the main surface 13 of the spatial light modulator 11, and the second incident light beam has the second incident angle α' with respect to the direction normal to the main surface 13 of the spatial light modulator 11. Optionally, any two adjacent pixels of a plurality of pixels of the spatial light modulator 1 are spaced apart from each other by a fixed distance. In one example, the fixed distance is a. Optionally, a distance between the main surface 13 of the spatial light modulator 11 and the imaging plane 12 is D. An angle θ between the direction of the first incident light beam and a direction from the incident point O on the main surface 13 of the spatial light modulator 11 to a lateral edge of the first projection region C satisfies the following equation:

$$\sin \theta = \frac{1}{2a}$$

An angle θ' between the direction of the second incident light beam and a direction from the incident point O' on the main surface 13 of the spatial light modulator 11 to a lateral edge of the second projection region D satisfies the following equation:

$$\sin\theta' = \frac{1}{2a}$$

wherein θ'≠θ.

A height L of the first projection region C satisfies the following equation:

$$L = D\tan(\theta+\alpha) + D\tan(\theta-\alpha)$$

A length M of the top base of the first projection region C satisfies the follow equation.

$$M = \frac{2D\tan\theta}{\cos(\theta-\alpha)}$$

A length N of the bottom base of the first projection region C satisfies the follow equation:

$$N = \frac{2D\tan\theta}{\cos(\theta+\alpha)}$$

A height L' of the second projection region D satisfies the following equation.

$$L' = D\tan(\theta'+\alpha') + D\tan(\theta'-\alpha')$$

A length M' of the top base of the second projection region D satisfies the follow equation:

$$M' = \frac{2D\tan\theta'}{\cos(\theta'-\alpha')}$$

A length N' of the bottom base of the second projection region D satisfies the follow equation:

$$N' = \frac{2D\tan\theta'}{\cos(\theta'+\alpha')}$$

wherein θ'=θ, and α'>α. A size of the second projection region D on the imaging plane 12 is greater than a size of the first projection region C on the imaging plane 12.

A combination of the trapezoidal distortion and the ratio of enlargement of image result in an image distortion on the imaging plane 12. In some embodiments, to correct the image distortion, the two-dimensional holographic image projection display method further includes encoding a first image loaded onto the first modulating part 111 to perform a first image correction on a first image distortion in the first projection region, thereby forming a first corrected projection region H having a substantially rectangular shape; and encoding a second image loaded onto the second modulating part 112 to perform a second image correction on a second image distortion in the second projection region, thereby forming a second corrected projection region I having a substantially rectangular shape. Optionally, subsequent to performing the first image correction and the second image correction, the first corrected projection region and second corrected projection region are stitched together to form a composite corrected imaging region F on the imaging plane 12. The composite corrected imaging region F has a shape closer to a rectangle as compared to the composite imaging region E.

In some embodiments, in the lateral direction of the spatial light modulator 11, the length M of the top base of the first projection region C is smaller than the length N of the bottom base of the first projection region C, e.g. M<N; the length M' of the top base of the second projection region D is smaller than the length N' of the bottom base of the second projection region D. e.g. M'<N'. The length M of the top base of the first projection region C is smaller than the length M' of the top base of the second projection region D, e.g. M<M'. Each of the lengths of short sides (top bases) of the first corrected projection region H, the second corrected projection region I, and the composite corrected imaging region F formed by stitching the first corrected projection region H and the second corrected projection region I together, is substantially same as a minimum width along the lateral direction of the spatial light modulator 11 of the first projection region C and the second projection region D. In some embodiments, the minimum width along the lateral direction of the spatial light modulator 11 of the first projection region C and the second projection region D is the length M of the top base of the first projection region C. Optionally, the length of short sides of the first corrected projection region H, the second corrected projection region I, and the composite corrected imaging region F equals to the length M of the top base of the first projection region C.

Optionally, the first corrected projection region H abuts the second corrected projection region I at the interface substantially parallel to the lateral direction of the spatial light modulator 11, along the longitudinal direction of the spatial light modulator 11, a length of a long side of the composite corrected imaging region F equals to a sum of the height L of the first projection region C and the height L' of the second projection region D, e.g. L+L'. Optionally, the maximum size of the composite corrected imaging region F is twice of the size of the projection region A in FIG. 1. Optionally, the maximum size of the composite corrected imaging region F is twice of the size of the projection region B in FIG. 3. Optionally, an aspect ratio of the composite corrected imaging region F can be adjusted by adjusting one of or a combination of the first incident angle α and the second incident angle α'.

Figure 5:
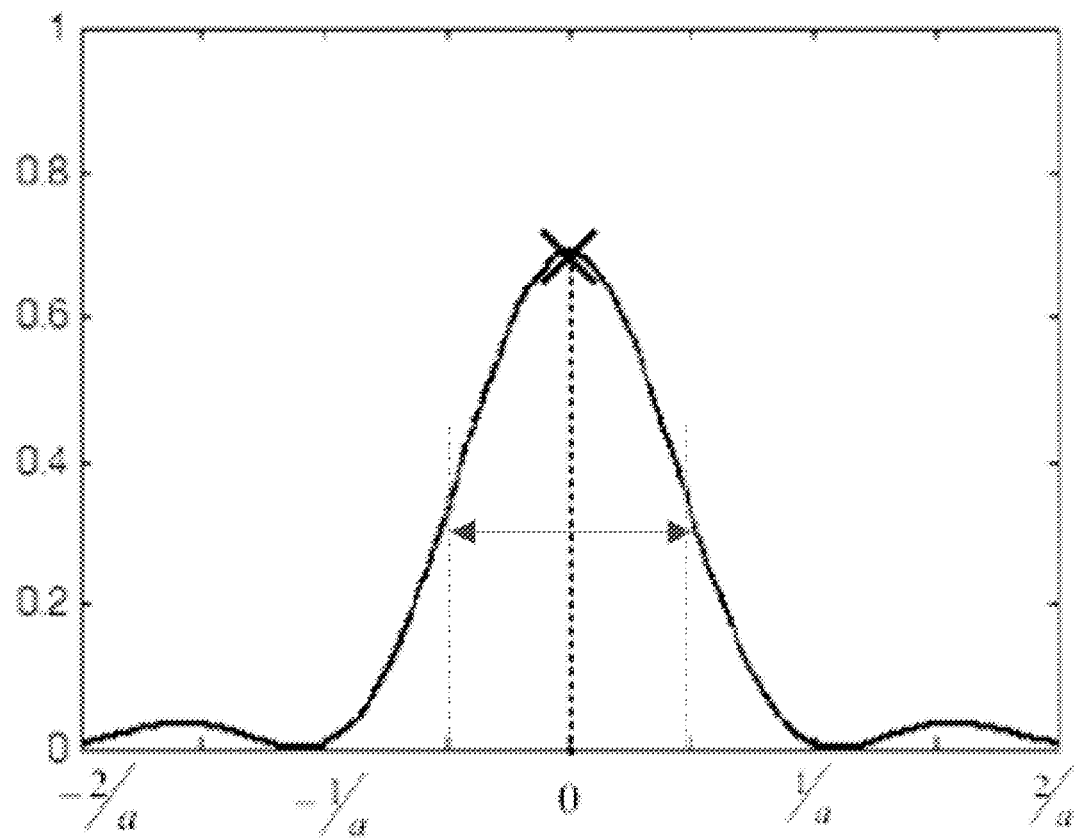
FIG. 5 is a schematic diagram illustrating one-dimensional diffraction intensity distribution in some embodiments according to the present disclosure.

FIG. 5 is a schematic diagram illustrating one-dimensional diffraction intensity distribution in some embodiments according to the present disclosure. Referring to FIG. 5, x-axis represents a projection region, and y-axis represents brightnesses of the respective portions of the projection region. The brightnesses of the respective portions of the projection region are distributed under sinc function. The available display area is shown in the middle of the FIG. 5. In order to ensure the brightness uniformity of the projection region, a two-dimensional holographic image projection display method further includes encoding the first image loaded onto the first modulating part to perform a first brightness uniformity correction pre-processing, and encoding the second image loaded onto the second modulating part to perform a second brightness uniformity correction pre-processing. Optionally, the first brightness uniformity correction pre-processing and the second brightness uniformity correction pre-processing adopt the following equation:

$$I_N(x, y) = \frac{I(x, y)}{\sin c\,(ax)\sin c\,(ay)}$$

wherein, $$-\frac{1}{2a} < x < \frac{1}{2a}, \text{ and } -\frac{1}{2a} < y < \frac{1}{2a};$$

x represents any point of a spatial light modulator along a longitudinal direction of the spatial light modulation; y represents the any point of the spatial light modulator along a lateral direction of the spatial light modulation; I(x, y) is a brightness of the any point of the spatial light modulator before a brightness uniformity correction pre-processing; $I_N$(x, y) is a brightness of the any point of the spatial light modulator after the brightness uniformity correction pre-processing; and a is a distance between any two adjacent pixels of a plurality of pixels of the spatial light modulator.

Figure 6:
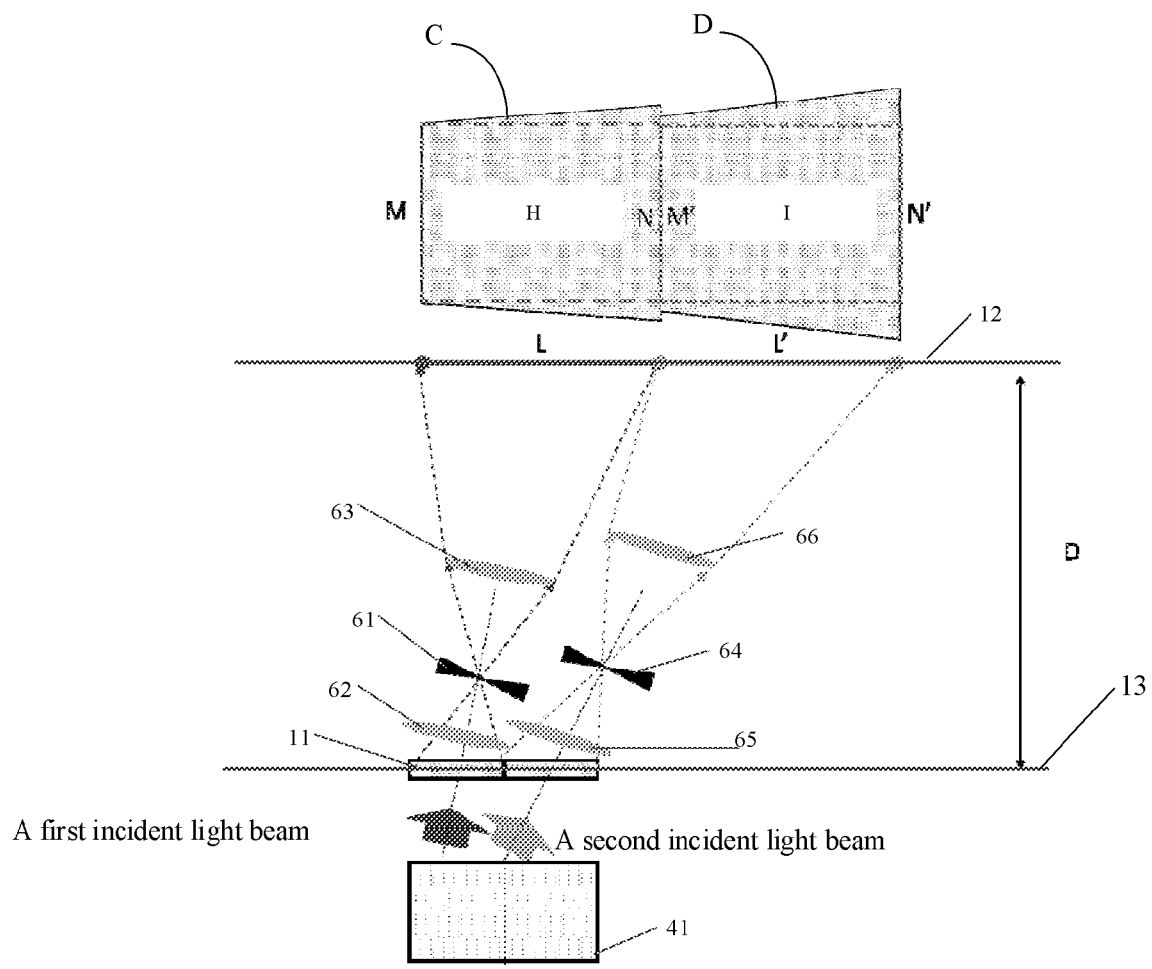
FIG. 6 is a schematic diagram illustrating a two-dimensional holographic image projection display method in some embodiments according to the present disclosure.

FIG. 6 is a schematic diagram illustrating a two-dimensional holographic image projection display method in some embodiments according to the present disclosure. Referring to both FIG. 4 and FIG. 6, to prevent higher-order sub-diffraction caused by stray light or the spatial light modulator 11, the two-dimensional holographic image projection display method further includes filtering a first modulated light modulated by the first modulating part 111; and filtering a second modulated light modulated by the second modulating part 112. In some embodiments, a first convex lens 62 is used to focus the first modulated light onto a first filter 61; and a second convex lens 65 is used to focus the second modulated light onto a second filter 64. In some embodiments, subsequent to filtering the first modulated light, a first filtered light is generated, and a third convex lens 63 is used to focus the first filtered light onto the imaging plane 12. In some embodiments, subsequent to filtering the second modulated light, a second filtered light is generated, and a fourth convex lens 66 is used to focus the second filtered light onto the imaging plane 12. The convex lenses facilitate the filtering process by die first filter 61 and the second filter 64, without substantially changing the first projection region C, the second projection region D, the first corrected projection region H, and the second corrected projection region I on imaging plane 12.

Various appropriate devices may be used for making the spatial light modulator 11. Examples of devices suitable for making the spatial light modulator 11 include, but not limited to, devices adopting Liquid Crystal on Silicon, and devices adopting Liquid Crystal Display.

In the present method, the first modulating part of the spatial light modulator is illuminated with the first incident light beam at the first incident angle with respect to the direction normal to the main surface of the spatial light modulator to form the first projection region on an imaging plane, the second modulating part of the spatial light modulator is illuminated with the second incident light beam at the second incident angle with respect to the direction normal to the main surface of the spatial light modulator to form the second projection region on an imaging plane. The first projection region abuts or partially overlaps with the second projection region at the interface substantially parallel to the lateral direction of the spatial light modulator. The first projection region and second projection region are stitched together to form the composite imaging region on the imaging plane. The composite imaging region has a substantially rectangular shape. In the present method, the first modulating part is used to display the first projection region having substantially square shape, and the second modulating part is used to display the second projection region having substantially square shape. Because each of the first modulating part 111 and the second modulating part 112 has a near-square rectangular shape, oversampling in each of the first modulating part 111 and the second modulating part 112 can be avoided, and the waste of computing resources and the space-bandwidth product of the spatial light modulator can also be avoided. Moreover, a projection region having substantially rectangular shape is more likely to satisfy viewers' watching habits.

In another aspect, the present disclosure also provides a two-dimensional holographic image projection display apparatus. Referring to FIG. 4, a two-dimensional holographic image projection display apparatus in some embodiments includes a spatial light modulator 11, an imaging plane 12, and an illumination source 41 configured to provide a first incident light beam illuminating a first modulating part 11 of the spatial light modulator at a first incident angle α with respect to a main surface 13 of the spatial light modulator 11, and a second incident light beam illuminating a second modulating part 112 of the spatial light modulator with a second incident light beam at a second incident angle α' with respect to the main surface 13 of the spatial light modulator 11. Optionally, the first modulating pan 111 of the spatial light modulator 11 is configured to modulate the first incident light beam to form a first projection region C on the imaging plane 12. Optionally, the second modulating part 112 of the spatial light modulator 11 is configured to modulate the second incident light beam to form a second projection region D on the imaging plane 12. Optionally, the first projection region C abuts or partially overlaps with the second projection region D at an interface substantially parallel to a lateral direction of the spatial light modulator 11. Optionally, the first projection region C and second projection region D are stitched together to form a composite imaging region E on the imaging plane 12. Optionally, the composite imaging region E has a substantially rectangular shape.

In some embodiments, the illumination source 41 is configured to provide the first incident light beam and the second incident light beam so that the first incident light beam and the second incident light beam are separated from each other at or about a boundary between the first modulating part 111 and the second modulating part 112.

In some embodiments, the first modulating part 111 is configured to encode a first image loaded onto the first modulating part 111 to perform a first image correction on a first image distortion in the first projection region, thereby forming a first corrected projection region H having a substantially rectangular shape; and the second modulating part 112 is configured to encode a second image loaded onto the second modulating part 112 to perform a second image correction on a second image distortion in the second projection region, thereby forming a second corrected projection region I having a substantially rectangular shape. Optionally, lengths of short sides of the first corrected projection region H, the second corrected projection region I, and the composite corrected imaging region F formed by stitching the first corrected projection region H and the second corrected projection region I together are substantially same as a minimum width along a lateral direction of the spatial light modulator 11 of the first projection region C and the second projection region D.

In some embodiments, the first modulating part 111 is configured to encode the first image loaded onto the first modulating part to perform a first brightness uniformity correction pre-processing; and the second modulating part 112 is configured to encode the second image loaded onto the second modulating part to perform a second brightness uniformity correction pre-processing.

In some embodiments, referring to FIG. 6, the two-dimensional holographic image projection display apparatus further includes a first filter 61 configured to filter the first modulated light modulated by the first modulating part 111 to generate a first filtered light; and a second filter 64 configured to filter a second modulated light modulated by the second modulating part to generate a second filtered light. In some embodiments, the two-dimensional holographic image projection display apparatus further includes a first convex lens 62 configured to focus the first modulated light modulated by the first modulating part onto the first filter 61; a second convex lens 65 configured to focus the second modulated light modulated by the second modulating part onto the second filter 64; a third convex lens 63 configured to focus the first filtered light onto the imaging plane 12; and a fourth convex lens 66 configured to focus the second filtered light onto the imaging plane 12.

In some embodiments, the illumination source 41 is configured to adjust one or a combination of the first incident angle α and the second incident angle α', thereby adjusting an aperture ratio of the composite imaging region. Using the present apparatus, the first modulating part of the spatial light modulator is illuminated with the first incident light beam at the first incident angle with respect to the direction normal to the main surface of the spatial light modulator to form the first projection region on an imaging plane; the second modulating part of the spatial light modulator is illuminated with the second incident light beam at the second incident angle with respect to the direction normal to the main surface of the spatial light modulator to form the second projection region on an imaging plane. The first projection region abuts or partially overlaps with the second projection region at the interface substantially parallel to the lateral direction of the spatial light modulator. The first projection region and second projection region are stitched together to form the composite imaging region on the imaging plane. The composite imaging region has a substantially rectangular shape. In the present method, the first modulating part is used to display the first projection region having substantially square shape, and the second modulating part is used to display the second projection region having substantially square shape. Because each of the first modulating part 1 and the second modulating part 112 has a near-square rectangular shape, oversampling in each of the first modulating part 111 and the second modulating part 112 can be avoided, and the waste of computing resources and the space-bandwidth product of the spatial light modulator can also be avoided. Moreover, a projection region having substantially rectangular shape is more likely to satisfy viewers' watching habits.

In some embodiments, the two-dimensional holographic image projection display apparatus further includes a memory, and one or more processors. The memory stores computer-executable instructions for controlling the one or more processors to perform various functions of the two-dimensional holographic image projection display apparatus described herein.

Examples of the non-transitory tangible computer-readable medium include, but not limited to, an electronic device, a magnetic device, a random-access memory (RAM), a read only memory (ROM), an erasable editable read only memory (EPROM or Flash memory), a fiber device, a portable compact disk read only memory (CDROM) and papers or medium where the computer-readable instructions can be printed. Optionally, the electronic device may be an electrical connection having one or more wires. Optionally, the magnetic device may be a portable computer disk cartridge. Optionally, the non-transitory tangible computer-readable medium is made of papers or medium where the computer-readable instructions can be printed. Therefore, the computer-readable instructions can be processed including scanning, editing, and translating to store in the memory of the two-dimensional holographic image projection display apparatus.

Various circuits may be used to control the two-dimensional holographic image projection display apparatus. Examples of circuits suitable to controlling the two-dimensional holographic image projection display apparatus include, but not limited to, a discrete logic circuit with logic gate circuit for implementing logic function on data signal, a dedicated integrated circuit with suitable combination of logic gate circuits, a programmable gate array (PGA), and a field programmable gate array (FPGA).

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A two-dimensional holographic image projection display method, comprising:

illuminating a first modulating part of a spatial light modulator with a first incident light beam at a first incident angle with respect to a direction normal to a main surface of the spatial light modulator to form a first projection region on an imaging plane; and illuminating a second modulating part of the spatial light modulator with a second incident light beam at a second incident angle with respect to the direction normal to the main surface of the spatial light modulator to form a second projection region on the imaging plane;

encoding a first image loaded onto the first modulating part to perform a first image correction on a first image distortion in the first projection region, thereby forming a first corrected projection region having a substantially rectangular shape; and encoding a second image loaded onto the second modulating part to perform a second image correction on a second image distortion in the second projection region, thereby forming a second corrected projection region having a substantially rectangular shape;

wherein the first projection region abuts or partially overlaps with the second projection region at an interface substantially parallel to a lateral direction of the spatial light modulator; and wherein lengths of short sides of the first corrected projection region, the second corrected projection region, and a composite corrected imaging region formed by stitching the first corrected projection region and the second corrected projection region together are substantially same as a minimum width along the lateral direction of the spatial light modulator of the first projection region and the second projection region.

2. The two-dimensional holographic image projection display method of claim 1, further comprising stitching the first projection region and second projection region are stitched together to form a composite imaging region on the imaging plane.

3. The two-dimensional holographic image projection display method of claim 2, wherein the composite imaging region has a substantially rectangular shape.

4. The two-dimensional holographic image projection display method of claim 2, further comprising adjusting an aperture ratio of the composite imaging region by adjusting one or a combination of the first incident angle and the second incident angle.

5. The two-dimensional holographic image projection display method of claim 1, wherein the first incident light beam and the second incident light beam are separated from each other at or about a boundary between the first modulating part and the second modulating part.

6. The two-dimensional holographic image projection display method of claim 1, further comprising:

encoding a first image loaded onto the first modulating part to perform a first brightness uniformity correction pre-processing; and encoding a second image loaded onto the second modulating part to perform a second brightness uniformity correction pre-processing.

7. The two-dimensional holographic image projection display method of claim 1, further comprising:

filtering a first modulated light modulated by the first modulating part; and filtering a second modulated light modulated by the second modulating part.

8. A two-dimensional holographic image projection display apparatus, comprising:

a spatial light modulator;

an imaging plane; and an illumination source configured to provide a first incident light beam illuminating a first modulating part of the spatial light modulator at a first incident angle with respect to a main surface of the spatial light modulator, and a second incident light beam illuminating a second modulating part of the spatial light modulator with a second incident light beam at a second incident angle with respect to the main surface of the spatial light modulator;

wherein the first modulating part of the spatial light modulator is configured to modulate the first incident light beam to form a first projection region on the imaging plane;

the second modulating part of the spatial light modulator is configured to modulate the second incident light beam to form a second projection region on the imaging plane;

the first projection region abuts or partially overlaps with the second projection region at an interface substantially parallel to a lateral direction of the spatial light modulator;

the first modulating part is configured to encode a first image loaded onto the first modulating part to perform a first image correction on a first image distortion in the first projection region, thereby forming a first corrected projection region having a substantially rectangular shape;

the second modulating part is configured to encode a second image loaded onto the second modulating part to perform a second image correction on a second image distortion in the second projection region, thereby forming a second corrected projection region having a substantially rectangular shape; and lengths of short sides of the first corrected projection region, the second corrected projection region, and a composite corrected imaging region formed by stitching the first corrected projection region and the second corrected projection region together are substantially same as a minimum width along a lateral direction of the spatial light modulator of the first projection region and the second projection region.

9. The two-dimensional holographic image projection display apparatus of claim 8, wherein the first projection region and second projection region are stitched together to form a composite imaging region on the imaging plane.

10. The two-dimensional holographic image projection display apparatus of claim 9, wherein the composite imaging region has a substantially rectangular shape.

11. The two-dimensional holographic image projection display apparatus of claim 9, wherein the illumination source is configured to adjust one or a combination of the first incident angle and the second incident angle, thereby adjusting an aperture ratio of the composite imaging region.

12. The two-dimensional holographic image projection display apparatus of claim 8, wherein the illumination source is configured to provide the first incident light beam and the second incident light beam so that the first incident light beam and the second incident light beam are separated from each other at or about a boundary between the first modulating part and the second modulating part.

13. The two-dimensional holographic image projection display apparatus of claim 8, wherein the first modulating part is configured to encode a first image loaded onto the first modulating part to perform a first brightness uniformity correction pre-processing; and the second modulating part is configured to encode a second image loaded onto the second modulating part to perform a second brightness uniformity correction pre-processing.

14. The two-dimensional holographic image projection display apparatus of claim 8, further comprising:
- a first filter configured to filter a first modulated light modulated by the first modulating part to generate a first filtered light; and
- a second filter configured to filter a second modulated light modulated by the second modulating part to generate a second filtered light.

15. The two-dimensional holographic image projection display apparatus of claim 14, further comprising:
- a first convex lens configured to focus the first modulated light modulated by the first modulating part onto the first filter;
- a second convex lens configured to focus the second modulated light modulated by the second modulating part onto the second filter;
- a third convex lens configured to focus the first filtered light onto the imaging plane; and
- a fourth convex lens configured to focus the second filtered light onto the imaging plane.

* * * * *